(No Model.)
K. A. LOOMIS.
CRUPPER.
No. 457,651. Patented Aug. 11, 1891.
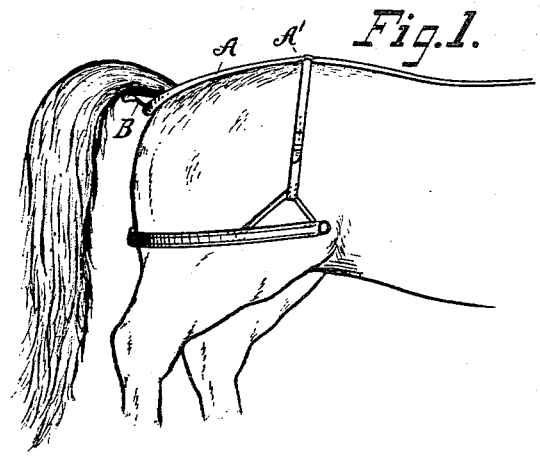
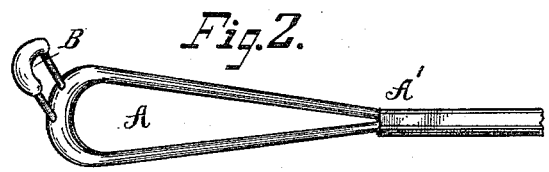
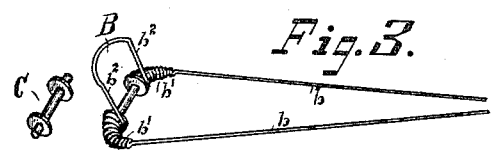
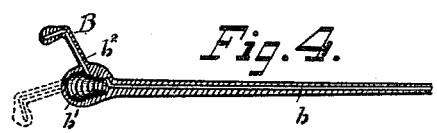
WITNESSES
D. W. Bradford
F. Clough
INVENTOR
Kelsey A. Loomis.
By Wells W. Leggett
Attorneys.

UNITED STATES PATENT OFFICE.

KELSEY A. LOOMIS, OF ALBION, MICHIGAN.

CRUPPER.

SPECIFICATION forming part of Letters Patent No. 457,651, dated August 11, 1891.

Application filed March 16, 1891. Serial No. 385,187. (No model.)

*To all whom it may concern:*

Be it known that I, KELSEY A. LOOMIS, a citizen of the United States, residing at Albion, county of Calhoun, State of Michigan, have invented a certain new and useful Improvement in Cruppers for Harness; and I declare the following to be a full, clear, and exact description of the invention, such as will enable others skilled in the art to which it pertains to make and use the same, reference being had to the accompanying drawings, which form a part of this specification.

In the drawings, Figure 1 is a view of a horse with a harness provided with my improved crupper. Fig. 2 is a separate view of the crupper. Fig. 3 is a separate view of the spring and spacer. Fig. 4 is a section showing combination of interior and exterior parts.

Horsemen are frequently annoyed by the fact that a horse otherwise valuable is disfigured in his general appearance and his salableness by reason of the fact that he holds his tail down closely to his flanks, giving him an awkward and ungainly appearance. This is especially true when the horse has this habit or trait when traveling. Most horses hold the tail well out, and with a horse possessing the trait above described it is difficult to match him in making up a team. Horses have been treated in various ways to remedy this defect, and among other courses horsemen have resorted to the process termed "nicking," which consists in pricking or cutting across the dock of the tail, beneath the tail, close to the body. This is, however, a cruel process. It frequently fails to accomplish the object, and the scars constitute a readily-distinguishable blemish. I purpose to remedy the difficulty by locating on the crupper a positive lifter, whereby the tail may be held at a proper elevation in traveling.

In carrying out the invention, A represents the crupper of a harness.

B represents the exterior support, which I attach to the crupper. I make the said support yielding, and to this end I construct the said support of spring-wire, consisting of two arms $b$, coiled into the form of a spiral spring at the points $b'$, then terminating with the projecting loop B, the projecting portions, and especially the loop B, being suitably enlarged or padded, so as not to cut or irritate the dock of the tail. It is manifest that in use this projecting loop B will yield, substantially as shown by the dotted lines in Fig. 4, and while serving to lift the tail while the animal is traveling will permit the animal to drop the tail when at rest.

C is a spacer engaged between the spiral springs $b'$ so as to prevent them from crowding toward each other when the support is pressed down by the tail. The arms $b$ may extend back any suitable distance. I prefer to carry them back to the portion A' adjacent to the hip-straps, in order that they may be thoroughly secured, and not serve to break the apparent continuity of the back-strap.

What I claim is—

In a crupper, for the purpose shown and described, the combination of the wires $b\ b$, formed into spiral springs $b'$ and at the inner extremities of said springs rising and forming loop B, and spreader C, said spreader, springs, and loop B being padded to avoid abrasion, substantially as described.

In testimony whereof I sign this specification in the presence of two witnesses.

KELSEY A. LOOMIS.

Witnesses:
MARION A. REEVE,
DELL J. BROWNE.